United States Patent [19]

Yuasa

[11] 4,227,808
[45] Oct. 14, 1980

[54] DIGITAL LIGHT MEASURING DEVICE

[75] Inventor: Yoshio Yuasa, Kawachinagano, Japan

[73] Assignee: Minolta Camera Kabushiki Kaisha, Osaka, Japan

[21] Appl. No.: 968,972

[22] Filed: Dec. 13, 1978

[30] Foreign Application Priority Data

Dec. 29, 1977 [JP] Japan .................................. 52-157685

[51] Int. Cl.³ ........................... G01J 1/42; G01J 1/46; G03B 7/08; G03B 7/00
[52] U.S. Cl. .................................. 356/218; 356/215; 354/23 D; 354/60 F
[58] Field of Search .............. 356/215, 218, 226, 227; 354/23 D, 60 F, 33, 145

[56] References Cited

U.S. PATENT DOCUMENTS 4,096,492  6/1978  Land et al. .......................... 354/60 F Primary Examiner—John K. Corbin
Assistant Examiner—Rodney Bovernick
Attorney, Agent, or Firm—Wenderoth, Lind & Ponack

[57] ABSTRACT

A digital light measuring device capable of measuring a flash of light generated by a separate source device, irrespective of trigger modes of an electronic flash selected in advance, which comprises means responsive to an incident light intensity for producing an input commensurate thereto; means for processing an output to form a digital signal indicative of a result of the light measurement; means for detecting the beginning of change in the output of the producing means caused by a flashing to generate a start signal for making the processing means begin the processing operation; means for controlling the operations of the processing means in a programmed sequence, and, where necessary, means for directing the controlling means to start the programmed sequence when a code-trigger mode is selectively chosen for the trigger mode of the electronic flash.

6 Claims, 5 Drawing Figures

DIGITAL LIGHT MEASURING DEVICE

BACKGROUND OF THE INVENTION

This invention relates to a light measuring device incorporated in a photographic camera, and more particularly, to a digital light measuring device of photocurrent integration type equipped with a microcomputer means as a controlling system.

Generally, the light measuring devices can be divided into two types, i.e., a photocurrent integration type and a photocurrent follow-up type, respectively, depending upon the difference in the functional characteristics therebetween.

More specifically, the photocurrent follow-up type mentioned above specifies the type which can successively output signals corresponding to momentary variation of the brightness of the object to be photographed, while on the contrary, in the photocurrent integration type, signal which corresponds to a total amount of light received by a photoelectric element incorporated in the device within a predetermined time-interval, is produced as an output.

Accordingly, in cases where pulse light such as light from electronic flash, etc. is to be measured, with the light measuring device of the photocurrent follow-up type employed for an exposure meter of a camera, there is such an inconvenience that the correct exposure may not be obtained due to follow-up nature inherent in the device mentioned above. Meanwhile, the light measuring device of photocurrent integration type wherein the light amount incident upon a photoelectric element is integrated for generating signal corresponding to the total sum of said light amount as output has the advantage that it becomes possible to measure the pulse light such as electronic flash light, etc., if employed for the exposure meter of a camera and the like.

Athough the photocurrent integration type is capable of measuring light such as the pulse light as described in the foregoing, when the photometric quantity produced as output signal is displayed in a digital mode, a number of additional components for accomplishing the above-mentioned purpose, for example, a counter, A-D converting part, and a decoder to be incorporated in a digital displaying device etc. are to be inevitably further included in the light measuring device. Consequently, if the light measuring device of the photocurrent integration type including the functions as described above is constituted by the conventional analog and digital circuit means, many circuit components are inevitably required and thereby, resulting in a high manufacturing cost and increased size of the light measuring device.

In order to overcome the disadvantages inherent in the known light measuring device as described above, there has conventionally been proposed the employment of the so-called microcomputer wherein control system, memory section, etc. are formed into one chip, with reduced power consumption, by which a light measuring device having a variety of functions may be achieved only by a small number of discrete circuit components, with consequent reduction in cost and size of the device. However, in the computerization of the light measuring device, problems as follows are further brought about due to the signal processing speed of the microcomputer, especially when a photo-trigger mode, in which an incidental light intensity of the electronic flash light is detected for measurement, is adapted for the device.

Generally, as is shown in FIG. 1, the shortest emitting duration of the automatically triggered electronic flash of the conventional type is in the vicinity of 40 $\mu$sec. In spite of the fact mentioned above, it takes, for example, about 5 $\mu$sec. for the measuring device to photoelectrically detect the incidental light intensity mentioned above, and further, 40 to 70 $\mu$sec for the microcomputer incorporated in the device to process the detection output of the above-mentioned incidental light intensity after having received the instruction provided by a closed loop therein, and then, to successively produce a starting signal of integral action as an output therefrom. As is clear from the fact mentioned above, by the moment whereat the starting signal of integral action is output, the emission of the electronic flash will have already been completed, thus making the light measuring incapable.

SUMMARY OF THE INVENTION

Accordingly, an essential object of the present invention is to provide a digital light measuring device of photocurrent integration type with microcomputer means incorporated therein as a controlling system, which can correctly measure light, e.g. even a pulse light with short emission time emitted by a separate light source device, irrespective of trigger modes selected in advance.

Another important object of the present invention is to provide a digital light measuring device of the above-described type which is capable of displaying an information representative of such as a diaphragm aperture value as a computational result of a combination of a photometric quantity light-measured and set shutter releasing speed together with set film sensitivity.

A further object of the present invention is to provide a digital light measuring device of the above-described type in which a circuit means is quite simply constituted, with quite a limited number of additionally components.

A still further object of the present invention is to provide a digital light measuring device of the above-described type, which can be readily incorporated, for example, in exposure meters of cameras of various types at low cost.

Another object of the present invention is to provide a digital light measuring device of the above-described type, which is highly efficient in function and can be manufactured at low cost.

In accomplishing these and other objects according to one preferred embodiment of the present invention, there is provided a digital light measuring device capable of measuring light, for example, even a pulse light brought about by an emission of light generated by a separate light source device, which comprises means responsive to an incident light intensity or an initial build-up of light of electronic flash for producing an output commensurate thereto; means for processing the output to form a digital signal indicative of a result of the light measurement; means for controlling the operations of the processing means in a programmed sequence, which is further adapted to generate a first control signal to be transmitted to the separate light source device for triggering a flash of light and a second control signal for making the processing means begin the processing operation in accordance with the programmed sequence; means for directing the controlling means to start the programmed sequence; and means for detecting the beginning of change in the output of the producing means caused by a flashing to generate a third control signal for making the processing means begin the processing operation without the second control signal from the controlling means and to generate a fourth control signal to inform the controlling means of the beginning of the processing operation so that the controlling means can make necessary operations in accordance with the programmed sequence without the direction from the directing means.

More specifically, the processing means mentioned above includes means for integrating the output of the producing means during a predetermined time, while the initiation of integrating action is controlled by the second control signal, and further, means for practicing A-D conversion of signal. Furthermore, the predetermined time counting for integration and the successive facilitating action of A-D conversion are both arranged to be accomplished in a programmed sequence through the controlling means mentioned above.

As described earlier, the integrating action of the integrating means is further arranged to be initiated by the third control signal, wherein the fourth control signal of the detecting means is adapted to inform the controlling means of the beginning of integration for beginning the counting of the predetermined time.

The controlling means is still further adapted to compute the light measuring result with the help of set shutter releasing speed together with set film sensitivity, to provide a digital information necessary for taking photographic pictures.

By the arrangement described in the foregoing, the digital light measuring device is capable of timely responding to a flash of light occurring without control of the first control signal from the controlling means.

Furthermore, irrespective of the trigger modes selected in advance, even the pulse light brought about by the emission of the electronic flash can be measured within permissible error ranges, without being affected by any initial-staged computational time-lag specific to the function of the conventional microcomputer.

Moreover, according to the present invention, since the microcomputer having a small scale is incorporated in the light measuring device as a controlling system, the light measuring device having a plurality of functional characteristics in spite of its compact size, in which the information based upon the photometric quantity brought about by the emission of the electronic flash, being necessary for taking photographic pictures, for example, such as the diaphragm aperture value are computed and thereby, to be displayed in a simple manner, can be manufactured at low cost with simple procedures.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals through several views of the accompanying drawings.

DETAILED DESCRIPTION OF THE INVENTION

Figure 1:
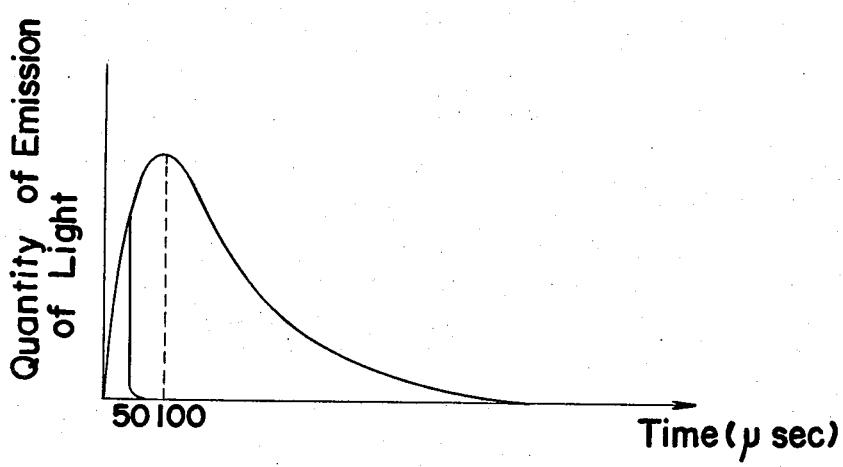
FIG. 1 is a graph showing a typical relationship between an amount of emission of the light caused by an electronic flash and time-interval.
Figure 2:
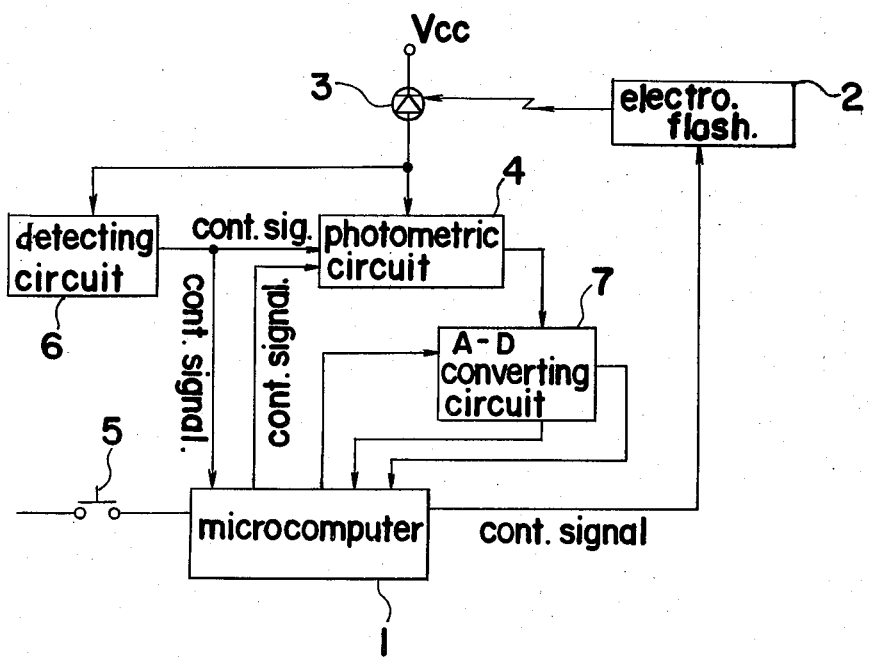
FIG. 2 is a block diagram showing one preferred embodiment of the digital light measuring device according to the present invention.

Referring now to the drawings, there is shown in FIG. 2 a block diagram of one embodiment of a digital light measuring device of a photocurrent integration type of the present invention, which comprises a microcomputer 1, an electronic flash 2 which can be fired at a predetermined moment through a predetermined actuation described hereinbelow, a photoelectric element 3 for converting thereby an emission of a light produced by the electronic flash 2, when received, into a photocurrent as an output thereof, a photometric circuit 4, a switch means 5 for instructing the microcomputer 1 to start its programmed sequence, a detecting circuit 6, and an analog to digital converting circuit means 7.

Figure 5:
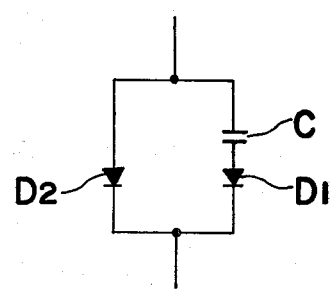
FIG. 5 is an electric circuit diagram showing an embodiment of a photometric circuit.

More specifically, the photometric circuit 4 is arranged to have a capability for integrating the output signal produced by the photoelectric element 3 and successively, producing a signal which is relatively proportional to the emission amount or a photometric quantity generated by the electronic flash 2 during a predetermined time-interval. The details of the photometric circuit 4 have already been disclosed in Japanese Patent Publication (Tokkosho) No. 50-28038 (1975), and therefore, the circuit disclosed may now be available for the above-mentioned purpose. More specifically, as shown in FIG. 5, the photometric circuit 4 disclosed in the above-mentioned publication includes a pair of parallel-connected diodes $D_1$ and $D_2$, each of which has the same electronic characteristics with each other, while one diode $D_1$ of the pair mentioned above is arranged to be connected in series to a capacitor C. By the arrangement mentioned above, a photometric quantity in a form of logarithmically amplified voltage commensurate to a photometric quantity is supplied by the capacitor C. Furthermore, the photometric circuit 4 is arranged to start an integration of the signal produced by the photoelectric element 3 in response to a control signal produced in a manner described hereinbelow.

According to the digital light measuring device of code trigger mode in which the light measuring operation is actuated by a signal synchronized with a signal which is so produced as to cause the electronic flash 2 to be emitted through the actuation of the switch means 5, the control signal mentioned above is arranged to be impressed through the microcomputer 1. In contrast with the impressing mode described in the foregoing, according to the digital light measuring device of photo-trigger mode in which the photometric operation is actuated through the detection of the incident light intensity of electronic flash light, the control signal mentioned above is directly impressed through the detecting circuit 6 which is arranged to detect the signal of the incident light intensity of the flash light produced by the photoelectric element 3.

As mentioned earlier, the analog to digital converting circuit means 7 is capable of converting the analog signal indicating the integrating result accomplished by the photometric circuit 4 into the digital signal.

The light measuring procedures which will be brought about by the digital light measuring device of the present invention are described in detail hereinbelow.

As far as the digital light measuring device of the photo-trigger mode is concerned, as soon as the electronic flash 2 separately provided is fired through some conventional mode, the flash light is received and thereby, converted into photocurrent to be generated as an output signal by the photoelectric element 3. The output signal mentioned above is sequentially impressed to the detecting circuit 6, so that an incident light intensity of the flash light emitted by the electronic flash 2 is successively detected. Subsequently, the detecting circuit 6 generates a control signal to be directly impressed to the photometric circuit 4, whereby the integration of the output produced by the photoelectric element 3 is started by the photometric circuit 4. Furthermore, another signal generated by the detecting circuit 6 is simultaneously impressed to the microcomputer 1, so that a counter (not shown in figures) incorporated in the microcomputer 1 can start counting at a predetermined time-interval for integration mentioned above so as to control the photometric circuit 4 to stop integration when the predetermined time is terminated.

More specifically, after the predetermined time-interval is terminated, the integration process of the photometric circuit 4 is arranged to be naturally stopped by a signal generated by the counter mentioned above, and thereby, the resultant value of the integration, i.e., an analog signal indicative of a photometric quantity or a light measuring quantity of the emission emitted by the electronic flash 2, is impressed to the A-D converting circuit 7. The integration value impressed to the A-D converting circuit 7 is successively converted into digital signal in response to a converting instruction which is to be produced by a microcomputer 1.

The light measuring value which has already been converted into the digital signal by the A-D converting circuit 7, consequently, is impressed to the microcomputer 1, so that the light measuring value may serve to compute and successively, to display, for example, a diaphragm aperture value for the combination of the other set value-inputs to the microcomputer 1, for example, exposure time.

As far as the digital light measuring device of code trigger mode is concerned, the microcomputer 1 is to start a programmed sequence, as soon as the switch means 5 is actuated, whereby the control signal is impressed to the photometric circuit means 4 so as to start the integration of the signal as described above, while the electronic flash is also simultaneously to be triggered by the control signal produced in synchronization with the actuation of switch means 5 and passed through the microcomputer 1. The sequential, photometric process of the device of the present trigger mode is accomplished in the similar manner as that accomplished by the device of the photo-trigger mode.

Figure 3:
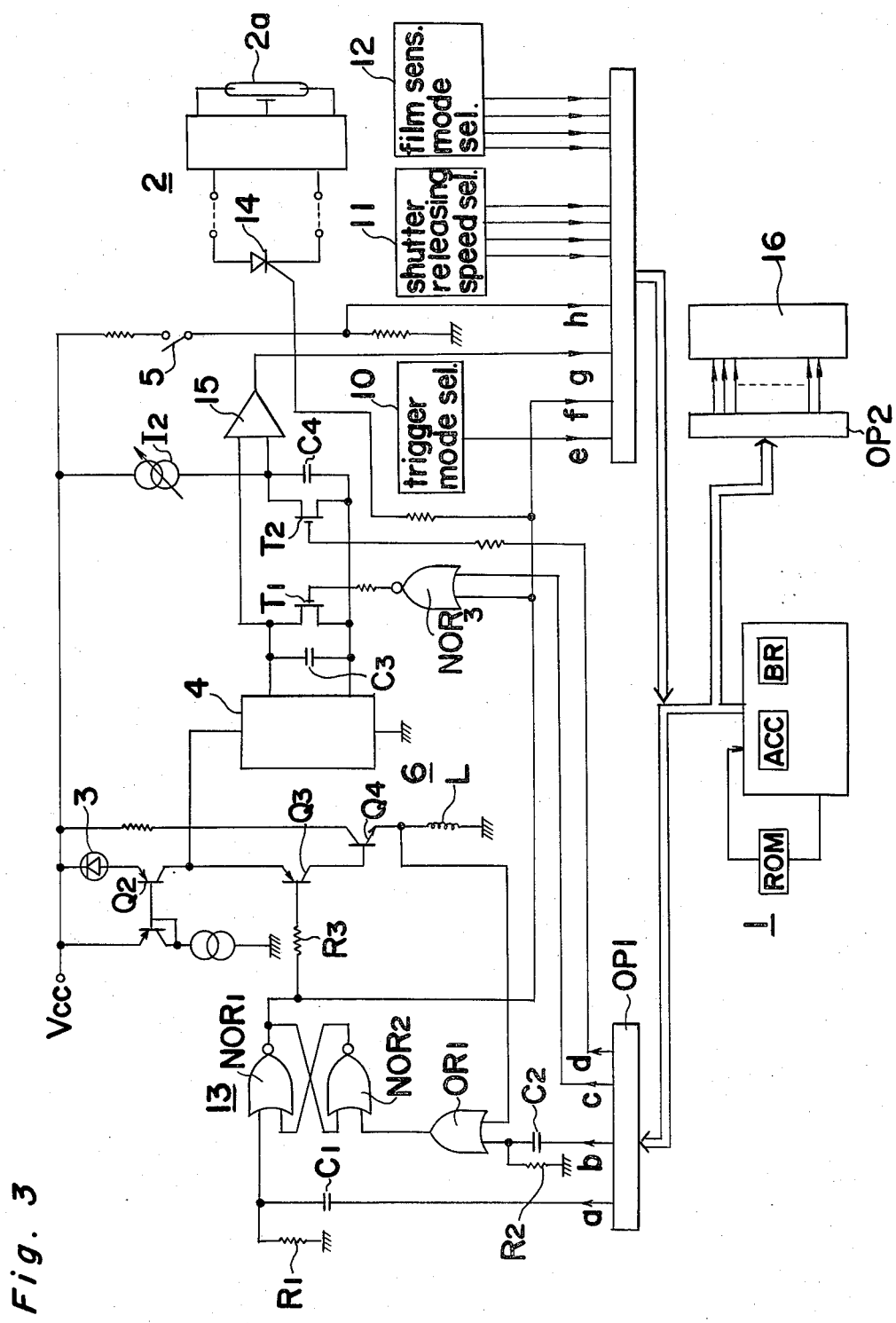
FIG. 3 is an electric circuit diagram of an exposure meter incorporated with the digital light measuring device of the embodiment shown in FIG. 2.

Referring now to FIG. 3, there is shown an embodiment of the present invention applied to an exposure meter, with like parts being designated by like reference numerals used in FIG. 2.

In this embodiment, a trigger mode selector 10 which permits the selection of one of the two trigger modes described in the foregoing is provided, wherein a digital signal "1" is impressed to an input port terminal "e" of the microcomputer 1 when the code trigger mode is selected for the trigger mode to be associated with the device, while a digital signal "0" is, on the contrary, impressed when the photo-trigger mode is alternatively selected.

Figure 4:
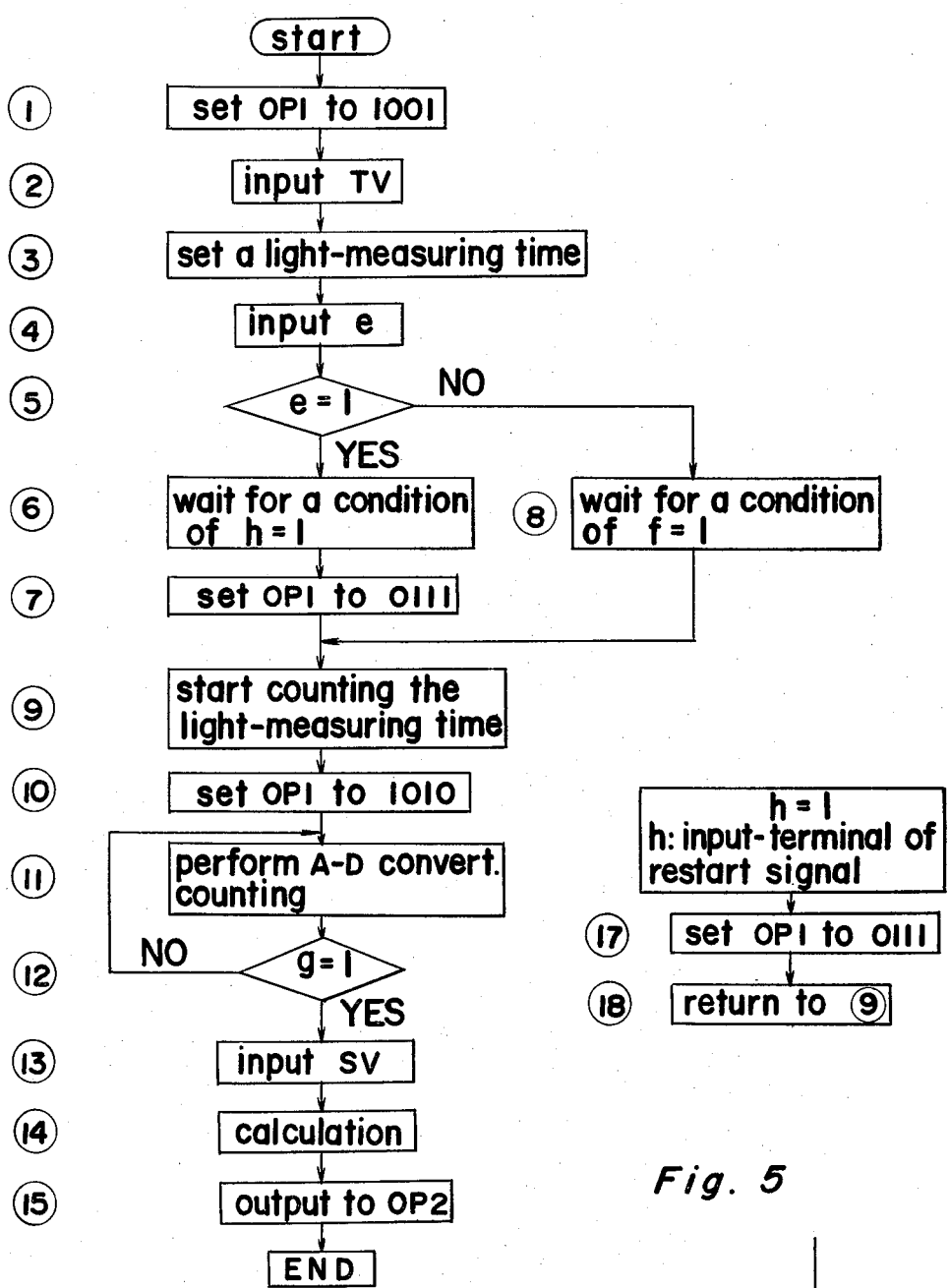
FIG. 4 is a flow chart of a microcomputer incorporated in one of embodiments of the digital light measuring devices of the present invention, particularly showing a sequential control procedure concerning the electric circuit shown in FIG. 3.

The microcomputer 1 incorporated in the present exposure meter as shown in FIG. 3 is so arranged that a central processing unit (CPU) together with semiconductor memories etc. are included by a large scale integration (LSI) constituted by one to several pieces of chip means, wherein a specific control program for accomplishing a sequential flow illustrated in FIG. 4 is memorized in a read only memory (ROM) part. Furthermore, although the present CPU includes several kinds of registers, arithmetic logic unit (ALU), stacks and other common provisions, as can be found in the common microcomputing means, only an accumulator (ACC) and a registor (BR) are specifically shown in FIG. 3.

Respective outputs of digital signals which are corresponding to respective setting values of a shutter releasing speed selector 11 and a film sensitivity mode selector 12 are both impressed to the input port of the microcomputer 1, as well.

A flip-flop 13 is constituted by a pair of NOR gates, i.e., NOR 1 and NOR 2. More specifically, one of input terminals of the NOR gate 1 is connected with a differentiation circuit comprising a capacitor $C_1$ and a resistor $R_1$, with which a signal from a terminal indicated by a of an output port $OP_1$ of the microcomputer 1 is arranged to be differentiated. Furthermore, an output terminal of the NOR gate 1 is connected not only with a base portion of a transistor $Q_3$ through a resistor $R_3$, but further with one of input terminals of a NOR gate 3, an input port f of the microcomputer 1, and a gate of a thyristor 14 which is ready for switching the emission of the electronic flash 2, respectively, which are arrayed in forward succession.

More specifically, an emitter of a transistor $Q_3$ is connected to a collector of a transistor $Q_2$ which is, in turn, connected to the photoelectric element 3, while a collector of the transistor $Q_3$ is connected to a base of a transistor $Q_4$. Furthermore, an emitter of the transistor $Q_4$ is connected to an inductance L which constitutes a detecting circuit 6. By the circuit arrangement described in the foregoing, when the device is in the photo-trigger mode, the photocurrent caused by the photoelectric element 3 is arranged to be conducted through the inductance L following the initial build-up of light of the emission of the electronic flash 2, so that a detection-pulse indicative of the incident light intensity concerning the emission mentioned above is to be generated.

The detection-pulse, or more particularly, a voltage caused by the inductance L is arranged to be supplied to the NOR circuit 2 through an OR circuit 1 by means of one of an input terminals of the OR circuit 1. An other input terminal of the OR circuit 1 mentioned above is connected to a capacitor $C_2$, which in turn connected to a terminal b of the output port $OP_1$ of the microcomputer 1 with an opposite terminal. The output terminal of the NOR circuit 3 mentioned above is connected to a gate of a field effect transistor (FET) denoted by $T_1$, which is parallel-connected with a capacitor $C_3$ for integration so that an integral action of the capacitor $C_3$ incorporated in the photometric circuit means 4 can be controlled by the FET mentioned above.

One terminal of the capacitor $C_3$ for integration is connected to one input terminal of a comparator or an analog comparing circuit 15 which is capable of comparing the integrated voltage with a predetermined reference voltage in a manner as described hereinbelow. The rest input terminal of the comparator 15 is connected to a capacitor $C_4$, which is ready for providing a reference voltage, whereby an output generated as the result of the comparison is so arranged as to be introduced into an input port g of the microcomputer 1. The resultant output from the analog comparing circuit 15 is so arranged as to serve as a controlling signal to control the functioning of an A-D converting part (not shown) included in the microcomputer 1, whereby, when the photometric quantity or the output concerning the value integrated by the capacitor $C_3$ for integration is greater than the predetermined reference integration value given by the capacitor $C_4$, the digital signal "1" is arranged to be impressed to the terminal g, so that the counting action of the counter for A-D converting purpose (not shown in the drawings) is stopped.

The switch 5, which is utilized in the device of code-trigger mode as mentioned earlier, is connected to a terminal h of the input port of the microcomputer 1, so as to be functioned as means for directing the microcomputer 1 to start the programmed sequence. A digital display part 16 is further prepared for displaying the diaphragm aperture value or f value.

In the followings, the functional characteristics of the circuit described in the foregoing are specifically described with reference to an accompanying sequential flow chart of FIG. 4, wherein it is here provided that the mode-selector 10 is arranged to be in the code trigger mode, and furthermore, the shutter releasing speed TV together with the film sensitivity SV are suitably adjusted through the shutter releasing speed selector 11 and the film sensitivity mode selector 12, respectively in advance.

As is shown in a flow chart in FIG. 4, an output indicative of "1001" is impressed to the output port $OP_1$ in response to a start instruction (as denoted by a number 1), to bring about the terminal a to be electrically high level, and thereby, to successively produce a pulse through the differentiation circuit comprising the capacitor $C_1$ and the resistor $R_1$, whereby a signal of high level is impressed to the NOR circuit 1 with the output of the NOR circuit 1, on the contrary, rendering to be a low level. Therefore, the output of the NOR circuit 3 becomes a high level and thereby, FET designated by $T_1$ is rendered conductive, whereby the capacitor $C_3$ is not electrically charged due to a short-circuiting caused by a conducting result described above. Similarly, a terminal designated by d is also brought into an electrically high level due to the digital representation mentioned above, and thereby, FET designated by $T_2$ is also rendered conductive, whereby the capacitor $C_4$ is neither electrically charged due to a short-circuiting caused by the same reason mentioned above. However, the respective transistor $Q_3$ and $Q_4$ are rendered conductive by means of the output produced by the NOR circuit 1.

At the next performance step concerned, the shutter releasing speed which is adjusted by the shutter releasing speed selector 11, is successively stored in the accumulator ACC (as denoted by a number 2), while a predetermined light measuring time is memorized by a registor BR (as denoted by a number 3). The trigger mode selector 10 is actuated (as denoted by a number 4), wherein the flow chart is divided into two flows, although one of two flows is written in a form of return form. Therefore, the present flow chart is arranged to process the forward statement following "YES" mode when the code-trigger mode is selected, while it is to process a return loop following "NO" mode when the photo-trigger mode is otherwise selected (as denoted by a number 5).

In the case where the code-trigger mode is to be selected, as soon as the light measuring actuating switch 5 is manually brought into ON condition, the signal bearing ON information thereon is successively impressed to an input terminal h, whereby the output terminals denoted by a, b, c, d in FIG. 3 are respectively brought into digital conditions representative of 0, 1, 1, 1 through a controlling instruction impressed by the CPU described earlier (as denoted by a number 7), after a lapse of time in which the input terminal h is brought into a condition representative of a digital number of 1 (as denoted by a number 6).

Consequently, the output produced by the NOR circuit (NOR 1) which constitutes the flip-flop 13 is rendered to be a high level, with the output produced by the NOR circuit (NOR 3) being a low level, whereby the FET denoted by $T_1$ is rendered non-conductive condition and thereby, the capacitor $C_3$ is charged by means of an electric current corresponding to the output current which is brought about by the photoelectric element 3. The output of the NOR circuit (NOR 1) is impressed to the gate of the thyristor 14, and successively, a discharging tube 2a of electronic flash 2 is emitted, because of the thyristor 14 having already been rendered conductive. The light emitted by the discharging tube 2a is received by the photoelectric element 3, and thereby, the photocurrent corresponding to the photometric quantity received by the photoelectric element 3 is conducted through the photometric circuit 4, so that the capacitor $C_3$ is to be charged up to a level of voltage which is corresponding to the photometric quantity mentioned above.

In connection with the situation described in the foregoing, the computational calculation, in which a number 1 is substracted from the contents stored in the registor BR of the microcomputer, is repeatedly accomplished so that the light measuring duration is to be correctly counted (as denoted by a number 9). As soon as the predetermined light measuring duration is counted out, a series of output terminals denoted by a, b, c, d are, specifically impressed by respective digital numbers, which are resultantly arrayed as "1010" on the output terminals mentioned above (as denoted by a number 10). Consequently, the output level of the NOR circuit (NOR 1) constituting the flip-flop 13 renders to be low, whereby the respective transistors $Q_3$ and $Q_4$ are rendered conductive and then, the electric current which flows within the photometric circuit 4 bypassed to the respective transistors $Q_3$ and $Q_4$. Due to the fact that a terminal denoted by c has already been brought into a condition represented by the digital number 1 as described above, the output of the NOR circuit (NOR 3) is maintained at a low level and thereby, FET denoted by $T_1$ is opened, whereby a voltage charged in the capacitor $C_3$ is further maintained in that corresponding to the photometric quantity which has already been attained by an amount up to the termination of the light measuring duration. Furthermore, since the terminal denoted by d has been brought into a condition indicative of the digital number 0 as described earlier, the gate $T_2$ is rendered non-conductive and resultantly, the capacitor $C_4$ is electrically charged by means of a constant electric current source $I_2$. Since the constant electric current source $I_2$ mentioned above is adjustable, errors caused by the light measuring operations, which result from the scatterings of the respective power capacities with respect to the respective predetermined values of capacitors $C_3$ and $C_4$, circuit components of the photometric circuit 4, the comparator 15, the photoelectric element 3 etc., can be compensated.

Furthermore, as far as the contents stored in the registor BR, the computational calculation of (BR'-1), in which a number 1 is substracted from the appropriate contents BR' which is readily stored for the comparison concerning A-D converting purpose, is repeatedly accomplished (as denoted by a number 11). In the course of the calculation described in the foregoing, the respective voltages of $C_3$ and $C_4$ are impressed to the comparing circuit 15, wherein the output level of the comparing circuit 15 is rendered to be high when there is no difference between both voltages impressed thereto as mentioned above, and thereby, the output of the comparing circuit 15 is successively impressed to the terminal g. Hence, as soon as the electric level of the terminal g is judged to be high enough (as denoted by a number 12), A-D convertion is brought into a stopped mode by means of a return loop, and then, the registor BR will contain the digital values indicative of photometric quantity therein.

Successively, the film sensitivity value chosen by the film sensitivity mode selector 12 is impressed to the microcomputer 1 (as denoted by a numer 13), whereby the diaphragm aperture value is computed through the CPU with the help of the digital value of the photometric quantity measured in a manner as described in the foregoing together with the selected value of the shutter releasing speed (as denoted by a number 14), and thereby, the resultantly computed value of a digital mode is displayed on the display part 16 (as denoted by a number 15).

In contrast with the code-trigger mode described in the foregoing, as far as the photo-trigger mode is selectively chosen as a trigger mode of the device, the input terminal e is given to represent a digital number of "0". Furthermore, as for the initial condition, the respective transistors $Q_2$, $Q_3$, $Q_4$ are all rendered conductive as can be found in the case of the code-trigger mode described in the foregoing.

Under the circuit condition described in the foregoing, as soon as the discharging tube $2a$ is emitted through an actuation of the thyristor 14 triggered by the completion of depressing switching means of pushbutton type (not shown in the figures), the photocurrent generated by the photoelectric element 3 which receives the emission light caused by the discharging tube $2a$ is conducted within the inductance L through the transistors $Q_2$, $Q_3$, $Q_4$, respectively. A voltage is produced through the inductance L following the occurrence of the initial build-up of light. The voltage thus produced is impressed to the OR circuit (OR 1) and, further to the NOR circuit (NOR 2) constituting the flip-flop 13 in succession, whereby the level of the output of the NOR circuit (NOR 1) is rendered to be high.

Consequently, the transistors $Q_3$ and $Q_4$ are both brought into non-conducting conditions, respectively, as well as the level of the output of the NOR circuit (NOR 3) is rendered to be low, whereby the light measuring is accomplished in a manner as described in the foregoing due to the fact that the gate $T_1$ has been already brought into OFF condition, or non-conductive condition. Furthermore, in association with the introduction of output to the NOR circuit (NOR 3), the output described above is also impressed to the microcomputer 1 through the input port f of the microcomputer 1. By the arrangement mentioned above, the detecting circuit 6 can generate a signal to inform the microcomputer 1 of the beginning of the processing operation so that the microcomputer can make successive necessary operations in accordance with the programmed sequence without the instruction by the switch means 5.

In connection with the situation described above, a signal, which is so produced by the photoelectric element 3 as to actuate the photometric circuit 4 after having received the incidental light intensity of emission, is directly impressed through the NOR circuit (NOR 3) constituting the flip-flop 13 without being transmitted through the microcomputer 1, whereby a response actuation takes place at about 5 μsec and thus, the faulty light measuring does not take place.

Instead of the thyristor 14 of the present embodiment described above, an ignitor element, for example, such as triac (Trielectrode AC switch), etc. may be alternatively adapted.

When the electronic flash 2 is intended to be fired in synchronization with the change-over actuation of the switch 5 without employing a semiconductor switching element, for example, the thyristor or triac, it generally takes approximate 50 states, which are equivalent to about 25 to 50 μsec, only to instruct the performance for causing h to be brought into a digital condition represented by the number "1" as denoted by the state number 6 as shown in FIG. 4, and successive performance for displaying the output terminals a, b, c, d to be 0, 1, 1, 1, respectively, while the processing time duration mentioned above, however, depends upon the differences in capacities of the microcomputer to be employed.

Accordingly, as may be clear from the foregoing description, there may happen to be brought about a photometric error due to the incidental time lag of the performance of the microcomputer as described above. However, the time lag mentioned above i.e., 25 to 50 μsec can be compensated, by delaying the time duration of the triggering actuation of the electronic flash 2 to the emission of the electronic flash through introduction, for example, of a mechanically successively actuating switching system or timer means. The photometric errors caused by the time lag mentioned above may be alternatively compensated by the introduction of the different processing procedure of the microcomputer, which is shown by a flow-chart of FIG. 4, including instructions denoted by a series of numbers of 17 and 18.

For performing the above-mentioned procedure, the terminal h is arranged to be an input terminal of a restart signal, so that the microcomputer 1 can begin with a certain instruction stored in a specific address of the stack of ROM, as soon as the terminal h is converted into the condition indicated by the digital number "1". At the step denoted by the number 17, an instruction, which instructs to cause the respective output terminals a, b, c, d to be converted into the respective conditions indicated by the digital numbers of 0, 1, 1, 1 is to be given. At the step denoted by the number 18, an instruction, which instructs the performance of the return of the processing procedure to the step denoted by the number 9.

By the procedure arrangement described hereinabove, the light measuring is to be started with a time lag of approximate 10 to 20 μsec, after the switch 5 is closed, and thereby, the error accompanied with the light measuring can hardly be brought about.

Furthermore, according to the present embodiment described in the foregoing, although the light measuring integrating result is arranged to be available for the calculation of the disphragm aperture value for the combination of the other set values, the scope of the present invention is not restricted by the embodiment mentioned above. Therefore, in other embodiments which are constituted to be included in the present invention, the detection of the accomplishment of the predetermined integral values may be arranged to be for use of prevention of emission of the electronic flash. Furthermore, it may be further so arranged that the exposure time associated with a shutter releasing step of the camera is controlled by the signal indicative of the integration value mentioned above.

As is specifically described in the foregoing, according to the present invention, since the microcomputer of a small scale is incorporated in the light measuring device as a controlling system, the light measuring device having a plurality of functional characteristics, in spite of its compact size, in which the information based upon the photometric quantity brought about by the emission of the electronic flash, being necessary for taking photographic pictures, for example, the diaphragm aperture value are computed and thereby, to be displayed in a simple manner, can be manufactured at low cost with a simple procedure.

Further advantage of the present invention is that, irrespective of the trigger modes selected in advance, even the pulse light brought about by the emission of the electronic flash can be measured within permissible error ranges, without being affected by any initial-stage computational time lag specific to the function of the microcomputer.

Still further advantage of the present invention is that an internal circuit means, to which the microcomputer is to be incorporated, is quite simply constituted with quite a limited number of provisions equipped to the circuit mentioned above for accomplishing all the objects of the present invention.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A digital light measuring device capable of measuring a flash of light generated by a separate light source device comprises means responsive to an incident light intensity for producing an output commensurate thereto; means for processing said output to form a digital signal indicative of a result of the light measurement; means for controlling the operations of said processing means in a programmed sequence, said controlling means being adapted to generate a first control signal to be transmitted to the separate light source device for triggering a flash of light and a second control signal for making said processing means begin the processing operation in accordance with the programmed sequence; means for directing said controlling means to start said programmed sequence; and means for detecting the beginning of change in the output of the producing means caused by a flashing, to generate a third control signal for making said processing means begin the processing operation without said second control signal from said controlling means and to generate a fourth control signal to inform said controlling means of the beginning of the processing operation so that said controlling means can make necessary operations in accordance with said programmed sequence without the direction from the directing means, whereby the digital light measuring device is capable of timely responding to a flash of light occurring without control of said first control signal from said controlling means.

2. A digital light measuring device as claimed in claim 1, wherein said processing means includes means for integrating said output of producing means during a predetermined time and means for practicing A-D conversion of signal, said second control signal controlling said integrating means to begin the integration of said output.

3. A digital light measuring device as claimed in claim 2, wherein said controlling means is further adapted to count said predetermined time for integration, to control said integrating means to stop integration when the predetermined time is up, and to facilitate the A-D conversion, in a programmed sequence.

4. A digital light measuring device as claimed in claim 3, wherein said third control signal of said detecting means is adapted to directly control said integrating means to begin the integration, and said fourth control signal of said detecting means is adapted to inform said controlling means of the beginning of integration for beginning the counting of the predetermined time.

5. A digital light measuring device as claimed in claim 4, wherein said controlling means is still further adapted to compute the light measuring result with present information.

6. A digital light measuring device capable of measuring a flash of light generated by a separate light source device comprises means responsive to an incident light intensity for producing an output commensurate thereto; means for processing said output to form a digital signal indicative of a result of the light measurement; means for detecting the beginning of change in the output of the producing means caused by a flashing to generate a start signal for making said processing means begin said processing operation; and means for controlling the operations of said processing means in a programmed sequence, said control means being adapted to start said programmed sequence in response to the start signal of said detecting means.

* * * * *